United States Patent
Abel

[15] 3,703,613
[45] Nov. 21, 1972

[54] ROTARY SWITCH WITH IMPROVED PIVOTALLY AND RECIPROCABLE MOUNTED THUMBWHEEL ACTUATOR

[72] Inventor: William E. Abel, Anderson, Ind.
[73] Assignee: General Motors Corporation, Detroit, Mich.
[22] Filed: July 16, 1971
[21] Appl. No.: 163,343

[52] U.S. Cl. ............ 200/11 TW, 200/11 J, 200/17 R, 200/156, 200/11 C
[51] Int. Cl. ..................... H01h 19/14, H01h 21/76
[58] Field of Search....200/4, 11 J, 11 TW, 16 C, 166 BE, 200/156, 17 R

[56] References Cited

UNITED STATES PATENTS

| | | | |
|---|---|---|---|
| 3,575,577 | 4/1971 | Cunnane | 200/156 X |
| 3,566,049 | 2/1971 | Wright | 200/11 TW X |
| 3,244,822 | 4/1966 | Elliott | 200/16 C |
| 3,300,748 | 1/1967 | Gabrielan | 200/11 TW X |
| 3,602,656 | 8/1971 | Graddy | 200/16 C X |
| 3,604,863 | 9/1971 | Schink | 200/16 C |

Primary Examiner—J. R. Scott
Attorney—Warren E. Finken et al.

[57] ABSTRACT

The shift selector mechanism illustrated includes a thumbwheel switch arrangement for control of an electrically-actuated transmission having conventional R–N–D–BL$_2$–L$_1$ gearshift selector ranges. The thumbwheel is mounted on a fixed pivot post by a slotted connection for both pivotal and reciprocal movement. A spring urges a follower on the thumbwheel into contact with an offset portion of a fixed arcuate guide slot for pivotal movement between "N" and "D" positions. Manual depression of the thumbwheel moves the follower out of the offset portion against the forces of the spring into contact with one of two spaced-apart portions of the arcuate guide slot for pivotal movement to some one of the R–L$_2$–L$_1$ positions. Contacts mounted on an end portion of the thumbwheel align radially and circumferentially with appropriate terminals for actuation of conventional transmission solenoid valves. A detent arrangement assures retention of the thumbwheel in the selected shift position.

6 Claims, 5 Drawing Figures

PATENTED NOV 21 1972 3,703,613
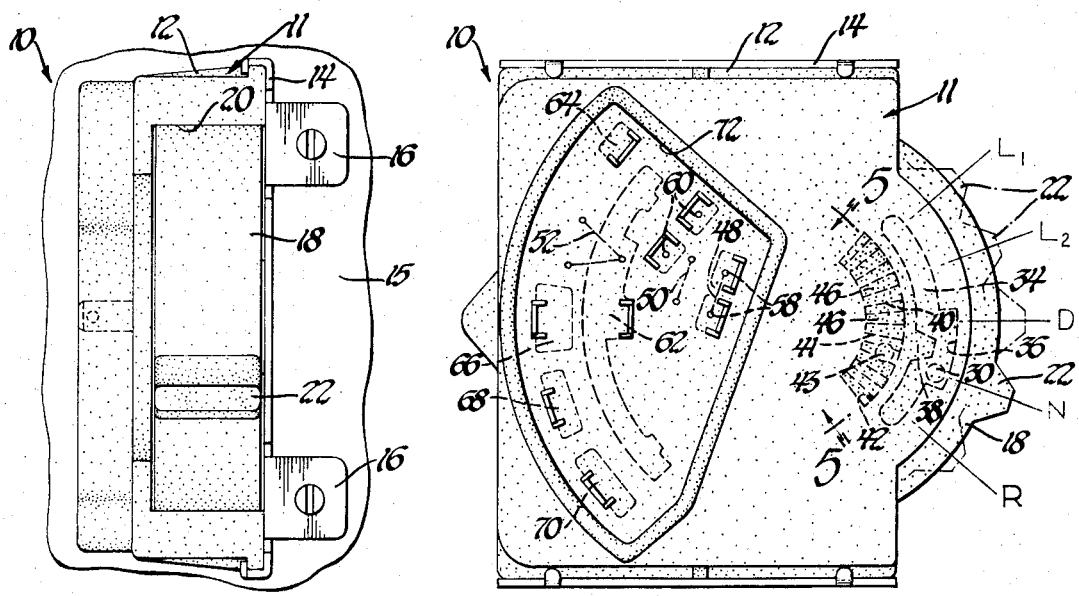
Fig.1
Fig.2
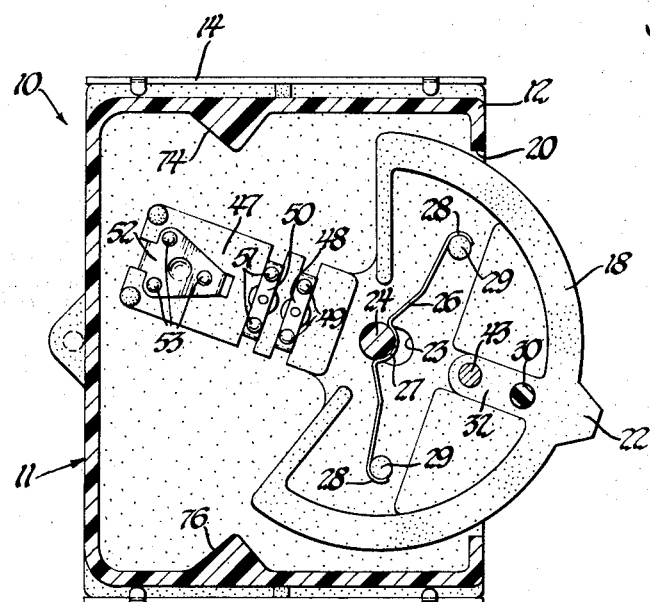
Fig.3
Fig.5
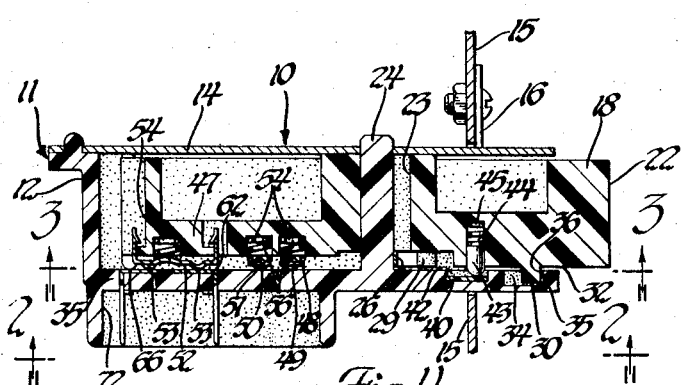
Fig.4
INVENTOR.
William E. Abel
BY
John P. Moran
ATTORNEY

ROTARY SWITCH WITH IMPROVED PIVOTALLY AND RECIPROCABLE MOUNTED THUMBWHEEL ACTUATOR

This invention relates generally to switches and, more particularly, to shift selector switches for controlling electrically-actuated transmissions.

A general object of the invention is to provide an improved instrument panel-mounted shift selector mechanism to replace conventional steering column-mounted shift selectors and to eliminate the need for separate Neutral-start switches which prevent automatic transmission-equipped vehicles from being started in any selector position other than Park or Neutral.

Another object of the invention is to provide an improved shift selector mechanism wherein a spring-loaded thumbwheel is both pivotally and reciprocally mounted about a fixed pivot post for pivotal movement along interconnected arcuate groove portions located at different radii with respect to the fixed pivot post for accommodating radial and circumferential alignment with respective battery, back-up light, and R–N–D–$L_2$–$L_1$ terminals.

A further object of the invention is to provide a shift selector switch including a thumbwheel mounted on a fixed pivot post by a slotted connection for both pivotal and reciprocal movement thereon, a spring for urging a follower member formed on the thumbwheel into contact with an offset portion of an arcuate guide slot for pivotal movement therealong between Neutral and Drive drive ratio positions, with manual depression of the thumbwheel being required to move the follower member out of the offset portion against the forces of the spring into contact with one of two separated portions of the arcuate guide slot adjacent the respective ends of the offset portion for pivotal movement to respective Reverse and Low drive ratio positions, a contact end portion on the thumbwheel for radial and circumferential alignment with appropriate terminals for actuation of conventional transmission solenoid valves, and a detent arrangement to reflect a "feel" for the respective shift positions.

These and other objects and advantages of the invention will become apparent when reference is made to the following description and accompanying drawings, wherein:

FIG. 1 is an end view of a shift selector switch mechanism embodying the invention;

FIG. 4 is a cross-sectional view of FIG. 1 taken along the plane of the paper;

FIGS. 2 and 3 are cross-sectional views taken along the planes of lines 2—2 and 3—3, respectively, of FIG. 4, and looking in the direction of the arrows; and FIG. 5 is a fragmentary cross-sectional view taken along the plane of line 5—5 of FIG. 2, and looking in the direction of the arrows.

Referring now to the drawings in greater detail, FIG. 1 illustrates a selector switch assembly 10 including a housing 11 made of any suitable nonconductive material, such as plastic, and having a body portion 12 and a cover 14 mounted on an instrument panel, represented generally at 15, and secured thereto by mounting flanges 16. A thumbwheel 18, also made of a suitable plastic, is mounted in the housing 11, with an arcuate portion thereof extending through an opening 20 formed in the housing body portion 12. An indicator projection 22 is formed on the exposed outer periphery of the thumbwheel 18.

As illustrated in FIG. 2, the thumbwheel 18 is rotatable in the vertical plane such that the indicator projection 22 may be selectively positioned in any one of the conventional R–N–D–$L_2$–$L_1$ shift indicating positions. It may be noted that, when in the NEUTRAL (N) and DRIVE (D) positions, the thumbwheel 18 and projection 22 extend farther out of the housing 11 than is the case for the REVERSE (R) and LOW ($L_2$) and ($L_1$) positions.

As illustrated in FIG. 3, this is due to the thumbwheel 18 having a central elongated opening 23 formed therein for mounting on a fixed pivot post 24 in the body portion 12 of the housing 11, the thumbwheel 18 having the right-hand (FIG. 3) portion of the slotted opening 23 positioned against the post 24 for the R, $L_2$, and $L_1$ positions, and the left-hand portion of the slotted opening 23 positioned against the post 24, as illustrated in FIG. 3, for the N and D positions. A detent spring 26 includes an intermediate arcuate section 27 seated on the pivot post 24, with its ends 28 abutted against a pair of pins 29 secured to the thumbwheel 18.

A projection or follower member 30 (FIG. 4) is formed on a face 32 of the thumbwheel 18. The follower member 30 extends into an arcuate guide slot 34 formed in an adjacent side wall 35 of the housing body portion 12. As may be noted in FIG. 2, the arcuate guide slot 34 includes a recess or stepped portion 36 spanning the arc between the N and D positions. A projection 38 is formed on a side of the guide slot 34 oppositely disposed from the center of the arcuate recess 36.

A detent section 40 (FIG. 2) including spaced, raised portions 41 (FIG. 5) is mounted in an arcuate groove 42 formed in the housing body portion 12 adjacent the arcuate guide slot 34. As illustrated in FIG. 4, a cup member 43 is slidably mounted in a pocket 44 formed in the face 32 of the thumbwheel 18 adjacent the arcuate groove 42. A spring 45 in the pocket 44 urges the cup member 43 into contact with the valley portions or seats 46 formed intermediate the adjacent raised portions or crests 41 of the detent section 40, the valley portions 46 being radially aligned with the respective shift indicating positions $L_1$–$L_2$–D–N–R, as illustrated in FIG. 2.

As illustrated in FIG. 3, the thumbwheel 18 includes a contact end portion 47 extending rearwardly into the housing body 12. The contact end portion 47 includes contact plates 48, 50, and 52, generally radially aligned with the fixed pivot post 24 and the indicator projection 22. Spaced contact bosses 49, 51, and 53 are formed on the contact plates 48, 50, and 52, respectively. As may be noted in FIG. 4, each of the contact plates 48, 50, and 52 is urged downwardly from the end portion 47 by a spring 54 mounted in its respective pocket 56.

Referring once again to FIG. 2, it may be noted that NEUTRAL start-up terminals 58, back-up light terminals 60, an arcuate-shaped battery terminal strip 62, a REVERSE solenoid terminal 64, a DRIVE solenoid terminal 66, and respective $L_2$ and $L_1$ LOW solenoid terminals 68 and 70 are mounted on a portion of the side wall 35 of the housing body portion 12. The terminals 64, 66, 68, and 70 are connected to the respective REVERSE, DRIVE, and LOW solenoid valves (not shown) in the transmission of the associated vehicle. Comparing FIGS. 2 and 3, it may be noted that the contact plate 48 is circumferentially aligned with the NEUTRAL start-up terminals 58; the contact plate 50 is circumferentially aligned with the back-up light terminals 60; and that the third contact plate 52 is wide enough for the bosses 53 thereon to circumferentially align with both the battery terminal strip 62 and the circle of R, D, $L_2$ and $L_1$ solenoid terminals 64, 66, 68, and 70, respectively. The respective ends of the terminals 58–70 extend through the wall 35 of the housing body 12 into an adjacent cavity 72 formed outside the wall 35. A pair of oppositely disposed stop members 74 and 76 (FIG. 3) are formed in the housing body portion 12 to limit the upward and downward swings, respectively, of the contact end portion 47 about the fixed pivot post 24.

In operation, assume first a NEUTRAL position as illustrated in FIG. 2, i.e., with the contact plates 48, 50, and 52 being positioned as shown. It may be realized that in this position, the detent spring 26 urges the thumbwheel 18 outwardly such that the follower member 30 is located in the corner of the recess 36 of the arcuate guide slot 34, while the cup member 43 is urged into contact with the radially aligned valley portion 46 of the detent section 40 by the spring 45. In the N position, the contact bosses 49 are in contact with the NEUTRAL start-up terminals 58, while one contact boss 53 is in contact with the battery terminal strip 62, but the remaining two bosses 53 are not in contact with any of the terminals 64, 66, 68, or 70, which serve to actuate respective solenoid valves (not shown) in the transmission. It is only in this position that the vehicle may be started since the terminals 58 complete the usual starting circuit.

In order to shift to the DRIVE or D position, the indicator projection 22 is rotated upwardly in FIG. 2 until the follower member 30 (FIG. 4) is moved into the upper corner of the recess 36, at which time the spring-loaded cup member 43 will have traveled over the adjacent crest 41 into the next upper seat 46. With the indicator projection 22 in such DRIVE (D) position, the contact bosses 53 are in contact with both the DRIVE solenoid terminal 66 and the battery terminal strip 62, thus completing the circuit to the respective drive solenoid valve in the transmission.

In order to shift to LOW, it is necessary that the indicator projection 22 and the associated thumbwheel 18 be pushed inwardly, thereby compressing the detent spring 26 and bringing the right-hand (FIG. 3) edge of the slotted opening 23 into contact with the fixed pivot post 24, while the follower member 30 (FIG. 4) is moved into the arcuate guide slot 34 above (FIG. 2) the projection formed on the opposite side wall of the guide slot 34. The thumbwheel 18 is then rotated in the upper portion (FIG. 2) of the guide slot 34 to either the $L_2$ or $L_1$ position as desired, the precise locations of same being indicated by the spring-loaded cup member 43 dropping into the respective radially aligned seat 46 of the detent section 40. The contact bosses 53 are in contact with the battery terminal strip 62 and one of the $L_2$ or $L_1$ terminals 68 or 70, respectively, and the circuit is thus completed to the desired LOW solenoid valve (not shown) of the transmission.

In order to shift into REVERSE, from LOW, for example, the thumbwheel 18 is rotated downwardly in FIG. 2. Once the follower member 30 on the thumbwheel 18 approaches the projection 38 of the arcuate groove 42, the detent spring 26 will urge the thumbwheel 18 outwardly, moving the follower member 30 into the recess 36. The thumbwheel 18 is then rotated downwardly until the projection 38 is cleared by the follower member 30, then manually pushed inwardly, once again compressing the detent spring 26, and the follower member 30 rotated downwardly in the guide slot 34 to the R radial position of the thumbwheel 18, such position being assured by the cup member 43 having been urged into the lowermost seat 46 (FIGS. 2 and 5) of the detent section 40. As previously indicated, this brings the radially outer contact bosses 53 into contact with the REVERSE solenoid terminal 64, while the radially inner contact boss 53 remains in contact with the battery terminal strip 62, thus completing the circuit to the appropriate solenoid valve (not shown) of the transmission.

As may be noted in FIG. 2, with the thumbwheel 18 in the position just described, the contact bosses 51 serve to span the back-up light terminals 60, thus completing the back-up light circuit to provide lights for REVERSE operation.

A review of FIG. 2 illustrates that throughout any movement of the contact bosses 53 across the R–N–D terminals, contact with the adjacent terminal will have been made by the leading contact boss 53 of the contact plate 52 before the trailing contact boss 53 thereof leaves the previously selected terminal, thus assuring that the transmission will not shift to NEUTRAL, such as occurs between the DRIVE and REVERSE terminals 66 and 64, respectively, due to the space therebetween.

It should be apparent that the invention provides a compact and highly efficient instrument panel-mounted shift selector switch mechanism wherein engine start-up is possible only while a thumbwheel indicator is in Neutral, with the Drive position being a short pivotal movement away from the Neutral position, and with manual depression of the thumbwheel from the Neutral position being required before pivotal movement to Reverse drive range is possible and manual depression of the thumbwheel from the Drive position being required before pivotal movement to either of two Low drive ranges is possible.

While but one embodiment of the invention has been shown and described, other modifications thereof are possible.

I claim:

1. A shift selector switch mechanism comprising a housing having a fixed pivot formed therein, a thumbwheel pivotally and reciprocally mounted about said pivot in said housing for manual movement to selected drive ratio positions, arcuate guide means formed on said housing, a follower member formed on said thumbwheel for cooperation with said arcuate guide means, spring means for urging said follower member of said thumbwheel radially outwardly from said pivot with respect to said arcuate guide means, and circuit means formed on said thumbwheel and on said housing and including start-up, reverse, low and drive range circuitry, said start-up and drive range circuits being completed when said follower member is positioned in said radial outward position and pivoted to predetermined circumferential locations therealong, said reverse drive ratio circuit being completed when said thumbwheel is manually depressed against the force of said spring means to move said follower member radially inwardly from said start-up position and then to pivot said follower member in one direction with respect to said arcuate guide means to a first predetermined circumferential location therealong, and said low drive ratio circuit being completed when said thumbwheel is manually depressed against the force of said spring means to move said follower member radially inwardly from said drive range position and then to pivot said follower member in the opposite direction with respect to said arcuate guide means to a second predetermined circumferential location therealong.

2. A shift selector switch mechanism comprising a housing, a thumbwheel pivotally and reciprocally mounted in said housing for manual movement to selected drive ratio positions, female guide means formed on said housing, said female guide means including relative inner and outer arcuate portions, male guide means formed on said thumbwheel, spring means for urging said male guide means of said thumbwheel to said outer arcuate portion of said female guide means, a plurality of contacts formed in predetermined locations on said thumbwheel, start-up, reverse, low and drive ratio terminals formed in predetermined locations on said housing for forming respective circuits upon selective cooperation with said plurality of contacts, said start-up and drive circuits being completed when said male guide means is positioned in said outer arcuate portion of said female guide means and pivoted therealong, said reverse and low ratio circuits, respectively, being completed when said thumbwheel is manually depressed against the force of said spring means to move said male guide means into said inner arcuate portion of said female guide means and pivoted in opposite directions therealong.

3. The shift selector switch mechanism described in claim 2, and detent means operatively connected between said thumbwheel and said housing for holding said thumbwheel in each of said start-up, drive, reverse, and low ratio positions of said thumbwheel with respect to said housing.

4. The shift selector switch mechanism described in claim 3, wherein said detent means includes a spring-loaded extension member mounted on said thumbwheel, and a plurality of peaks and valleys formed on said housing and circumferentially aligned with the arcuate path followed by said extension member as it travels with said thumbwheel, said valleys being radially aligned with said respective start-up, drive, reverse, and low ratio positions of said thumbwheel with respect to said housing.

5. A shift selector switch mechanism comprising a housing, a thumbwheel including connector means for pivotal and reciprocal mounting in said housing, a portion of said thumbwheel extending outwardly through said housing, an indicator formed on said extended portion of said thumbwheel for manual depression and pivotal movement of said thumbwheel to selected drive ratio positions, a radial extension formed on said thumbwheel, arcuate slot means formed in said housing and including a first divided portion at one radius and a second intermediate portion at a second radius bridging said divided portion, a follower formed on said thumbwheel for extension into said arcuate slot means, spring means for urging said thumbwheel radially outwardly so as to position said follower in said second intermediate portion, a plurality of contacts formed on said radial extension of said thumbwheel, and a plurality of terminals formed on said housing for radial and circumferential alignment with respective contacts upon selective radial and rotary movement of said thumbwheel for selectively completing start-up, drive, reverse and low ratio circuits, said start-up and drive ratio circuits being completed when said follower is positioned in the respective ends of said second intermediate portion, said reverse ratio circuit being completed when said follower is manually depressed against the force of said spring means into the portion of said first divided portion of said arcuate slot means adjacent said start-up position and pivoted therein, and said low ratio circuit being completed when said follower is manually depressed against the force of said spring means into the portion of said first divided portion adjacent said drive position and pivoted therein.

6. A shift selector switch mechanism comprising a housing, a fixed pivot post secured in said housing, an opening formed in said housing, a thumbwheel having a slotted opening formed therein for pivotal and reciprocal mounting on said pivot post, a portion of said thumbwheel extending outwardly through said opening, an indicator formed on said extended portion of said thumbwheel for manual depression and pivotal movement of said thumbwheel to selected drive ratio positions, a radial extension formed on said thumbwheel, an arcuate slot formed in said housing, an arcuate recess formed along an intermediate portion of said arcuate slot outwardly from said pivot post, a projection formed in said arcuate slot opposite an intermediate portion of said arcuate recess interrupting said arcuate slot, a follower member formed on thumbwheel for extension into either of said arcuate recess or arcuate slot, a pair of retainers formed on said thumbwheel, a spring mounted between said fixed pivot post and said pair of retainers for urging said thumbwheel radially outwardly so as to position said follower member in said arcuate recess, a plurality of terminals formed on said housing, a plurality of contacts formed on said radial extension of said thumbwheel for selectively contacting said respective terminals to complete start-up, drive, low and reverse ratio circuits, said start-up and drive ratio circuits being completed when said follower member is positioned in the respective ends of said arcuate recess, said reverse ratio circuit being completed when said follower member is manually depressed against the force of said spring into the portion of said interrupted arcuate slot adjacent said start-up position and pivoted therein, and said low ratio circuit being completed when said follower member is manually depressed against the force of said spring into the portion of said interrupted arcuate slot adjacent said drive position and pivoted therein, a spring-loaded cup member mounted on said thumbwheel, and a plurality of arcuately-aligned alternately located peaks and flat-bottomed valleys formed on said housing adjacent said cup member, said flat-bottomed valleys being radially aligned with said respective start-up, drive, reverse, and low ratio positions of said thumbwheel.

* * * * *